United States Patent
Brown et al.

(10) Patent No.: US 6,221,325 B1
(45) Date of Patent: Apr. 24, 2001

(54) PROCESS FOR CONTROLLING AMMONIA SLIP IN THE REDUCTION OF SULFUR DIOXIDE EMISSION

(75) Inventors: Gregory Norman Brown, Round Rock, TX (US); Michael L. Mengel, Fredericksburg, PA (US)

(73) Assignee: Marsulex Environmental Technologies, LLC, Lebanon, PA (US)

(*) Notice: Subject to any disclaimer, the term of this patent is extended or adjusted under 35 U.S.C. 154(b) by 0 days.

(21) Appl. No.: 09/149,211

(22) Filed: Sep. 8, 1998

(51) Int. Cl.$^7$ .................................................. B01D 53/50
(52) U.S. Cl. ............................ 423/243.06; 423/243.01; 423/DIG. 9
(58) Field of Search .................. 423/243.06, 243.01, 423/DIG. 9

(56) References Cited

U.S. PATENT DOCUMENTS

| | | |
|---|---|---|
| 3,883,639 | 5/1975 | Cronkright, Jr., et al ............ 423/242 |
| 4,690,807 | 9/1987 | Saleem ................................. 423/242 |
| 5,362,458 | 11/1994 | Saleem et al. ..................... 423/243.06 |

FOREIGN PATENT DOCUMENTS

| | | | |
|---|---|---|---|
| 58-92451 | * | 7/1983 | (JP) ................................ 423/243.06 |
| 64-90018 | * | 4/1989 | (JP) ................................ 423/243.06 |
| 64-90019 | * | 4/1989 | (JP) ................................ 423/243.06 |

* cited by examiner

Primary Examiner—Gary P. Straub
Assistant Examiner—Timothy C Vanoy
(74) Attorney, Agent, or Firm—Gary M. Hartman; Domenica N. S. Hartman

(57) ABSTRACT

A wet flue gas desulfurization process for removing sulfur dioxide from flue gases. The process utilizes an ammonium sulfate scrubbing solution containing free dissolved ammonia as the reagent for the desulfurization process to produce ammonium sulfate as a valuable byproduct. The scrubbing solution contacts the flue gases and absorbs sulfur dioxide within an absorber of a flue gas scrubbing apparatus, and is then accumulated in a tank where the absorbed sulfur dioxide is reacted with oxygen and ammonia to produce ammonium sulfate. The scrubbing solution has a concentration of greater than 46% ammonium sulfate so as to have suspended solids of ammonium sulfate precipitate, preferably 1% to 20% suspended solids.

5 Claims, 1 Drawing Sheet

PROCESS FOR CONTROLLING AMMONIA SLIP IN THE REDUCTION OF SULFUR DIOXIDE EMISSION

FIELD OF THE INVENTION

This invention generally relates to processes by which sulfur dioxide gas is removed from utility and industrial flue gases. More particularly, this invention is directed to a wet flue gas desulfurization process and apparatus in which ammonium sulfate is produced as a valuable byproduct from sulfur dioxide removed from flue gases using an ammonium sulfate solution with suspended ammonium sulfate precipitates to reduce free ammonia in the scrubbed flue gases.

BACKGROUND OF THE INVENTION

Gas-liquid contactors and absorbers are widely used to remove substances such as gases and particulate matter from combustion or flue gases produced by utility and industrial plants. Often of particular concern are sulfur dioxide ($SO_2$) and other acidic gases produced by the combustion of fossil fuels and various industrial operations. Such gases are known to be hazardous to the environment, and their emission into the atmosphere is closely regulated by clean air statutes. The method by which these gases are removed with a gas-liquid contactor or absorber is known as wet flue gas desulfurization (FGD).

The cleansing action produced by gas-liquid contactors and absorbers is generally derived from the passage of gas through a tower cocurrently or countercurrently to a descending liquid that absorbs sulfur dioxide. Wet flue gas desulfurization processes have typically involved the use of an alkaline scrubbing liquid, such as a calcium-based slurry or a sodium-based or ammonia-based solution. As used herein, a slurry is a mixture of solids and liquids in which the content of the solids can be any desired level, including the extreme condition in which the slurry is termed a moist solid. Examples of calcium-based slurries are limestone (calcium carbonate; $CaCO_3$) slurries and hydrated lime (calcium hydroxide; $Ca(OH)_2$) slurries formed by action of water on lime (calcium oxide; CaO). Such slurries react with the acidic gases to form precipitates that can be collected for disposal, recycling or sale. Intimate contact between the alkaline slurry and acidic gases that are present in the flue gases, such as sulfur dioxide, hydrogen chloride (HCl) and hydrogen fluoride (HF), result in the absorption of the gases by the slurry and the formation of salts, such as calcium sulfite ($CaSO_3 \cdot \frac{1}{2}H_2O$), gypsum ($CaSO_4 \cdot 2H_2O$), calcium chloride ($CaCl_2$) and calcium fluoride ($CaF_2$). When desired, forced oxidation of the slurry by aeration is employed to ensure that all of the sulfites will be reacted to form sulfates, and thereby maximize the production of gypsum.

While gas-liquid contactors and absorbers utilizing calcium-based slurries as described above generally perform satisfactorily, their operation results in the production of large quantities of wastes or gypsum, the latter having only nominal commercial value. In contrast, ammonia-based scrubbing processes have been used in the art to produce a more valuable ammonium sulfate fertilizer. In these processes, sulfur dioxide is absorbed from flue gases with an ammonium sulfate solution or liquor, after which the sulfur dioxide is reacted with oxygen and anhydrous or aqueous ammonia injected into the solution to form additional ammonium sulfate solution or ammonium sulfate crystals ($(NH_4)_2SO_4$). Particular examples of such processes are disclosed in U.S. Pat. Nos. 4,690,807 and 5,362,458, each of which are assigned to the assignee of the present invention. U.S. Pat. No. 4,690,807 discloses the use of a saturated ammonium sulfate solution, while U.S. Pat. No. 5,362,458 discloses the more conventional use of a dilute (subsaturated) solution. In addition to being required to react with sulfur dioxide to produce ammonium sulfate, ammonia also serves to increase the efficiency of sulfur dioxide removal by reducing the acidity of the ammonium sulfate solution, which becomes more acidic with the absorption of sulfur dioxide.

An ongoing demand in processes such as those taught in U.S. Pat. Nos. 4,690,807 and 5,362,458 is the ability to control ammonia slip, which is free ammonia in the scrubbed flue gases exiting the gas contactor or absorber. In addition to incurring an economic loss because of lost ammonia, free ammonia in the scrubbed flue gases reacts with uncaptured sulfur dioxide and trioxide to create an ammonium sulfate aerosol that is visible as a blue or white plume in the stack discharge, leading to secondary pollution problems. Controlling the amount of free ammonia in the desulfurization process is in part a function of the ammonia vapor pressure, which results from a combination of pH and levels of unoxidized ammonium sulfite produced by the reaction of sulfur dioxide and ammonia in the absence of sufficient oxygen. High pH values result in high ammonia vapor pressure, which promotes ammonia slip. High levels of unoxidized ammonium sulfite also promote ammonia slip.

Generally speaking, the use and addition of anhydrous or aqueous ammonia to control sulfur oxide gases have resulted in undesirable levels of ammonia slip and associated poor aerosol control. Accordingly, it would be desirable if a flue gas desulfurization process were available that involved the addition of anhydrous or aqueous ammonia while controlling ammonia slip.

SUMMARY OF THE INVENTION

It is an object of this invention to provide a flue gas desulfurization process that utilizes an ammonium sulfate scrubbing fluid to remove sulfur dioxide from flue gases produced by utility and industrial facilities.

It is another object of this invention that such a process is characterized by a reduced amount of ammonia slip, which corresponds to reduced levels of free ammonia in the scrubbed flue gases that exit the process.

The present invention provides a wet flue gas desulfurization process for removing sulfur dioxide from flue gases produced by processing operations of the type carried out in utility and industrial plants. In particular, the process utilizes an ammonium sulfate solution into which is injected ammonia and oxygen, which react with sulfur dioxide absorbed in the solution to produce ammonium sulfate as a valuable byproduct. More particularly, the process of this invention generally entails the steps of delivering flue gases containing sulfur dioxide to a contactor region of an absorber, into which an ammonium sulfate scrubbing solution is introduced to contact the flue gases and absorb sulfur dioxide. According to the invention, the scrubbing solution has a concentration of greater than 46% ammonium sulfate so as to have suspended solids of ammonium sulfate precipitate, preferably 1% to 20% suspended solids. The scrubbing solution containing the sulfur dioxide is then accumulated in a vessel where the absorbed sulfur dioxide is reacted with oxygen and ammonia to produce ammonium sulfate. The scrubbing solution is continuously recycled from the vessel to the contactor region.

According to the invention, ammonia slip can be controlled when the ammonium sulfate concentration is maintained in the scrubbing solution above the saturation level of ammonium sulfate, i.e., 46%. The use of ammonium sulfate scrubbing solution at such high concentrations of ammonium sulfate is contrary to conventional wisdom since the oxidation rate of ammonium sulfite and ammonium bisulfite to ammonium sulfate and ammonium bisulfate decreases with total dissolved species concentration. With ammonium sulfate solutions contemplated by this invention, reaction tank volume is preferably increased 30% to 60% over conventional requirements to maintain a complete oxidation—nonetheless, a significant advantage is the reduction of ammonia slip in the scrubbed flue gases.

Other objects and advantages of this invention will be better appreciated from the following detailed description.

DETAILED DESCRIPTION OF THE INVENTION

In accordance with this invention, an improved flue gas desulfurization process and apparatus are provided, whereby sulfur dioxide gas entrained in a flue gas is removed through the use of scrubbing liquid to generate ammonium sulfate as a useful and valuable byproduct. While the invention will be described in reference to a desulfurization system that utilizes an absorber, those skilled in the art will recognize that the teachings of this invention can be readily applied to various other desulfurization systems, including gas-liquid contactors, scrubbing structures and various other equipment capable of being used in the process described for this invention. Furthermore, the desulfurization process of this invention is compatible with various systems capable of removing other undesirable gases, mist, dust, fumes, smoke and/or particulate matter from a stream of gas.

Figure 1:
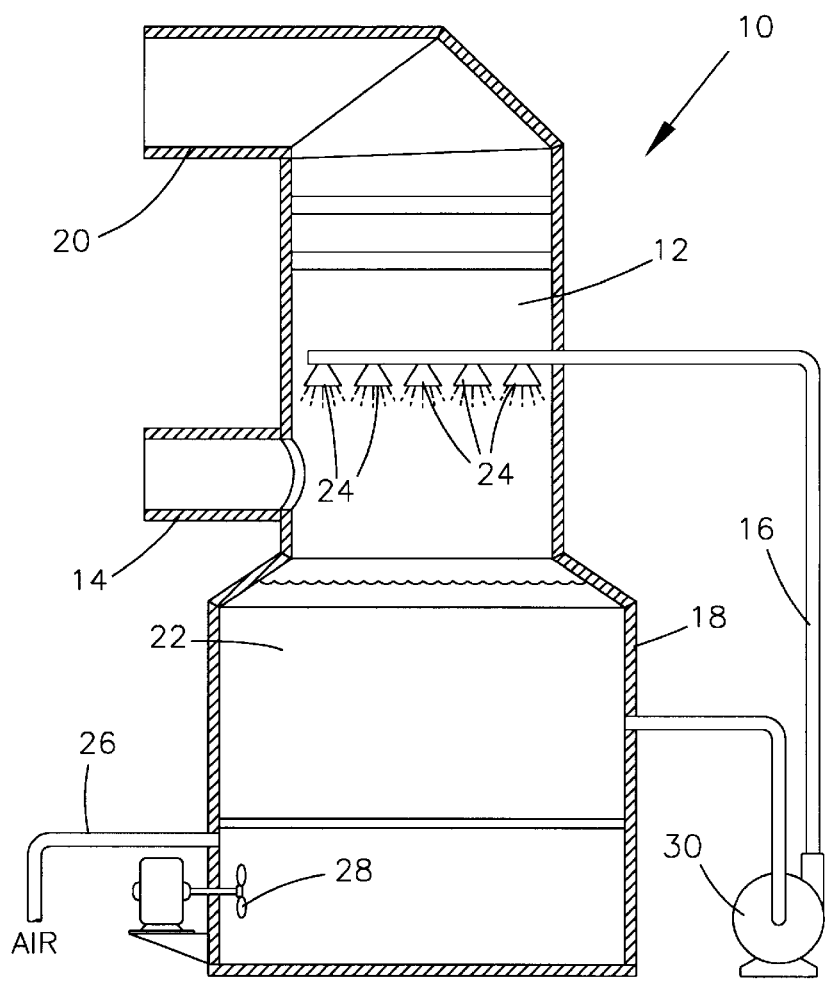
FIG. 1 is a schematic representation of an apparatus for a flue gas desulfurization process in accordance with this invention.

FIG. 1 is a schematic representation of a flue gas scrubbing apparatus 10 in accordance with this invention. As shown, the apparatus 10 has an upright absorber 12 that is supplied with flue gases through an inlet duct 14. The apparatus 10 operates in a manner that causes absorption of sulfur dioxide from the flue gases using a scrubbing solution 22. As illustrated, the passage of flue gases through the absorber 12 is countercurrent to the descending solution 22, though the invention is also applicable to gas flows cocurrent to solution flow. The scrubbed flue gases that leave the absorber 12 are delivered to a stack (not shown) or other suitable equipment through an outlet duct 20. The source of the flue gases may be any process involving the combustion of fossil fuels or various industrial operations by which undesirable gases or particulate matter are produced.

In accordance with this invention, the scrubbing solution 22 is an aqueous ammonium sulfate solution 22 containing free dissolved ammonia as the reagent for the desulfurization process. Ammonia is a primary reactant when producing ammonium sulfate as a byproduct of the desulfurization process, and the ammonium sulfate solution 22 serves as the liquid vehicle for delivering the ammonia to the absorber 12. As shown in FIG. 1, a pump 30 serves to recycle the ammonium sulfate solution 22 from a reaction tank 18 through a conduit 16 to a contactor region of the absorber 12, where the solution 22 is introduced through a number of nozzles 24 or other suitable devices.

The scrubbing process involves spraying the ammonium sulfate solution 22 into the absorber 12 so as to provide intimate contact between the solution 22 and the flue gas. As a result, the solution 22 absorbs sulfur dioxide and other acid gases, such as hydrogen chloride (HCl) and hydrogen fluoride (HF), if they are present in the flue gases. The solution 22 then falls into the reaction tank 18, where the absorbed sulfur dioxide reacts with the ammonia and is oxidized to form ammonium sulfate. Specifically, sulfur dioxide reacts with ammonia to form ammonium sulfite ($(NH_4)_2SO_3 \cdot HOH$) and ammonium bisulfite ($NH_4HSO_3$), which are oxidized in the presence of sufficient oxygen to form ammonium sulfate and ammonium bisulfate ($NH_4HSO_4$), the latter of which reacts with ammonia to form additional ammonium sulfate. An agitator, such as the fan 28 shown in FIG. 1, may be employed to promote these reactions. A portion of the ammonium sulfate solution 22 and/or ammonium sulfate precipitate that form in the solution 22 can then be drawn off to yield the desired byproduct of this reaction.

In accordance with prior practices, sufficient ammonia is delivered to the tank 18 to control the pH of the ammonium sulfate solution 22 within a typical range of about 4 to 6 pH range, such that the solution 22 is highly reactive for high efficient capture of sulfur dioxide. As indicated above, a reaction occurs during the scrubbing operation between the injected ammonia and sulfur dioxide that, with forced oxidation 26, results in the production of additional ammonium sulfate. If hydrogen chloride and/or hydrogen fluoride are present in the flue gas, as is the case with flue gas produced by the combustion of coal, these acidic gases are also captured to form ammonium chloride and ammonium fluoride.

Figure 2:
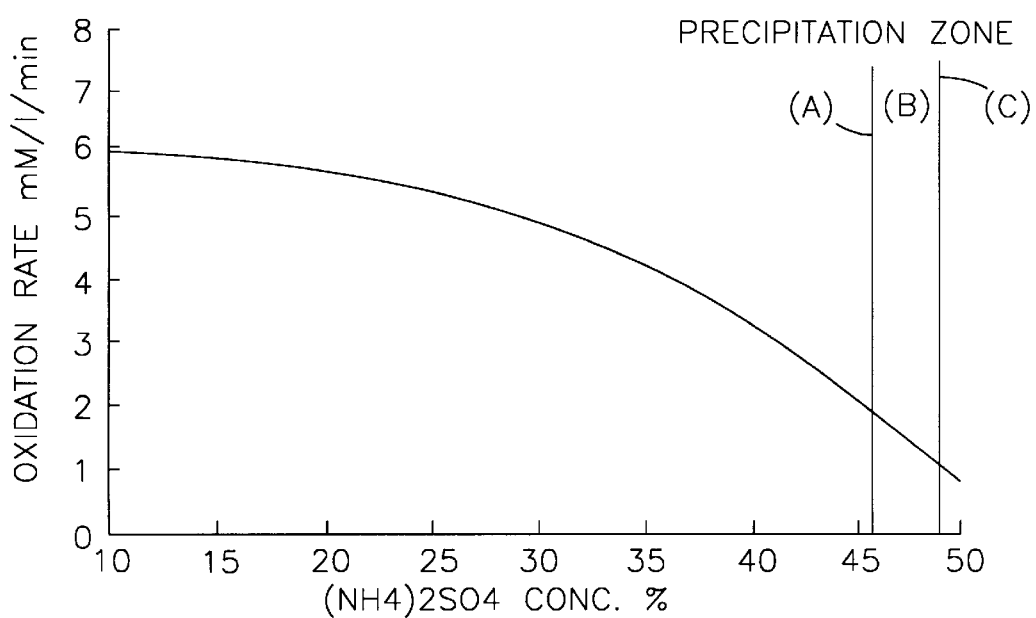
FIG. 2 is a graph showing the relationship between the oxidation rate and ammonium sulfate concentration in an ammonium sulfate scrubbing solution.

The present invention is based on the determination that injected ammonia promotes high levels of ammonia slip, meaning that free ammonia enters the absorber 12, some of which reacts with sulfur dioxide to form an ammonium sulfate aerosol, resulting in ammonia and ammonium sulfate aerosol escaping the absorber 12 and being discharged into the atmosphere. According to the prior art, a sufficient amount of ammonium sulfate would be removed from the ammonium sulfate solution 22 prior to delivery to the absorber 12 in order to maintain the solution 22 at approximately 46% by weight dissolved ammonium sulfate. However, the present invention intentionally maintains the ammonium sulfate solution 22 above the saturation level, i.e., above 46% dissolved ammonium sulfate, with a preferred suspended solids content of about 1% to 20% by weight. As evidenced from FIG. 2, the oxidation of ammonium sulfite and ammonium bisulfite to ammonium sulfate and ammonium bisulfate is significantly slowed as the ammonium sulfate concentration in the scrubbing solution increases. Consequently, subsaturated solutions (below level "A" in FIG. 2) have been employed in the prior art as evidenced by U.S. Pat. No. 5,362,458. However, according to this invention, the scrubbing solution 22 can be maintained above saturation levels for ammonium sulfate, resulting in the presence of suspended ammonium sulfate precipitate while advantageously controlling ammonium slip in the scrubbed flue gases produced by the desulfurization process. Depending on operating temperature, the range for ammonium sulfate concentration contemplated by this invention is above 46% (level "A" of FIG. 2) up to about 49% (level "c" of FIG. 2), which are indicated as the extremes of the precipitation zone "B" for ammonium sulfate in an aqueous solution.

The use of an ammonium sulfate scrubbing solution having such high concentrations of ammonium sulfate is contrary to conventional wisdom, because the oxidation rate of ammonium sulfite and ammonium bisulfite to ammonium sulfate and ammonium bisulfate decreases with dissolved salt concentration. With the determination that reducing or eliminating ammonium sulfite and bisulfite from the solution 22 greatly reduces ammonia slip, the present invention provides for a substantially lower oxidation rate to complete oxidation and thus avoid ammonia slip.

While the current invention has been described in terms of preferred embodiments, it is apparent that other forms could be adopted by one skilled in the art. For example, the features of this invention could be incorporated within flue gas desulfurization systems that differ from that represented in FIG. 1, slurry compositions could be employed that include constituents in addition to those disclosed, and other and/or additional equipment could be employed to further process the ammonium sulfate solution used by the process, as well as process those compounds produced by the flue gas desulfurization system. Accordingly, the scope of the invention is to be limited only by the following claims.

What is claimed is:

1. A process for removing sulfur dioxide from flue gases, the method comprising the steps of:

delivering flue gases containing sulfur dioxide to a contactor region of an absorber;

introducing into the absorber an ammonium sulfate scrubbing solution containing ammonia and having a concentration of ammonium sulfate above the saturation level of ammonium sulfate in the scrubbing solution so as to have suspended solids of ammonium sulfate precipitate, the scrubbing solution contacting the flue gases and absorbing sulfur dioxide from the flue gases;

accumulating the scrubbing solution containing absorbed sulfur dioxide in a tank;

oxidizing the scrubbing solution in the tank where the absorbed sulfur dioxide is reacted with oxygen and ammonia to produce ammonium sulfate and such that substantially all ammonium sulfite and ammonium bisulfite is eliminated from the scrubbing solution; and recirculating the scrubbing solution to the contactor region.

2. A process as recited in claim 1, wherein the scrubbing solution has an ammonium sulfate concentration of greater than 46% by weight.

3. A process as recited in claim 1, wherein the scrubbing solution contains 1% to 20% by weight suspended solids of ammonium sulfate precipitate.

4. A process for removing sulfur dioxide from flue gases, the method comprising the steps of:

delivering flue gases containing sulfur dioxide to a contactor region of an absorber;

introducing into the absorber an ammonium sulfate scrubbing solution into which ammonia has been injected, the scrubbing solution having a concentration of greater than 46% by weight ammonium sulfate so as to have 1% to 20% by weight suspended solids of ammonium sulfate precipitate, the scrubbing solution contacting the flue gases and absorbing sulfur dioxide from the flue gases;

accumulating the scrubbing solution containing the sulfur dioxide in a tank;

oxidizing the scrubbing solution in the tank so as to substantially eliminate all ammonium sulfite and ammonium bisulfite from the scrubbing solution; and recirculating the scrubbing solution to the contactor region.

5. A process as recited in claim 3, wherein the scrubbing solution has an ammonium sulfate concentration of 46% to 49% by weight.

* * * * *